United States Patent [19]

Richmond et al.

[11] Patent Number: 4,588,442

[45] Date of Patent: May 13, 1986

[54] REFRACTORY COMPOSITION

[76] Inventors: Colin Richmond, Stonewalls, Rosemary Lane, Burton, Rosset, Clwyd, Wales; Michael E. Bennett, 21 Forest Road, Claughton, Birkenhead Merseyside, England

[21] Appl. No.: 606,811

[22] PCT Filed: Aug. 15, 1983

[86] PCT No.: PCT/GB83/00204

§ 371 Date: Apr. 18, 1984

§ 102(e) Date: Apr. 18, 1984

[87] PCT Pub. No.: WO84/00747

PCT Pub. Date: Mar. 1, 1984

[30] Foreign Application Priority Data

Aug. 20, 1982 [GB] United Kingdom ............... 8223995

[51] Int. Cl.$^4$ .................... B29B 7/36; C04B 35/68
[52] U.S. Cl. .................... 106/38.27; 106/286.5; 501/94; 501/127; 524/2; 524/441; 524/445
[58] Field of Search ............... 106/38.22, 38.27, 286.5; 501/94, 127; 524/2, 441, 445

[56] References Cited

U.S. PATENT DOCUMENTS 3,923,526 12/1975 Takashima ................ 106/38.22
4,031,046 6/1977 Tisza .................. 106/38.22

FOREIGN PATENT DOCUMENTS 0082124 6/1983 European Pat. Off. .

*Primary Examiner*—Lorenzo B. Hayes

[57] ABSTRACT

A refractory containing refractory aggregate, clay binder, finely divided metallic powder and short length organic fibers.

8 Claims, No Drawings

REFRACTORY COMPOSITION

This invention relates to compositions for in situ firing to form a refractory lining and particularly relates to additives to such compositions to improve spalling resistance.

There is a requirement to improve the spalling resistance of in situ fired refractory linings so as to reduce the time required to form such linings. Spalling being essentially due to water being unable to escape from the lining as it cures. This reduction in "down time" by producing refractory lining compositions that are usable in a shorter time is referred to as rapid fire technology.

Various additives have been proposed in the prior art to improve the spalling resistance of such refractory compositions for example the use of a finely divided aluminium powder as described in United Kingdom Patent Specification No. 1541819. Alternatively, the use of short lengths of an organic fibre, preferably hydrophilic, has been proposed. Both these additives are effective in improving the spall resistance but both have disadvantages limiting the improvement to be gained. Addition of too great a proportion of aluminium powder causes an unacceptable amount of hydrogen to be evolved during the curing process, due to an alkaline reaction. Also, too much fibre affects the strength and flow properties of the uncured or green composition.

We have discovered that, surprisingly, addition of relatively modest amounts of both additives produces an improvement to the spalling resistance of a refractory mixture that is greater than that to be obtained for either additive alone.

According to the present invention, a composition for in situ firing to form a refractory lining comprises a refractory aggregate, a refractory clay binder, a hydrolytic substance and short length organic fibres. By hydrolytic substance is meant any substance that reacts with water to break the hydrogen oxygen bond or bonds and produce a solid and/or gaseous reaction product.

The hydrolytic substances act to help reduce the water content of the mixed but unfired lining and the short length fibres may act to convey water out of the lining before firing and, during firing, burn away to leave fine capillary bores in the lining that permit and encourage the escape of water vapour and steam.

In a preferred embodiment of the invention, the hydrolytic substance is up to 0.1% by weight of a finely divided metallic powder and the organic fibres are up to 0.1% by weight of a hydrophilic fibre.

Preferably the metallic powder is aluminium powder though other metal such as manesium, zinc and ferrosilicon could be used. It is also believed that other reactive materials such as nitrides and carbides which would generate gases in situ may be effective in place of metallic powder as the hydrolytic substance. The fibre is of approximately 6 mm in length, short length fibres being less effective and much longer fibres giving mixing problems. The fibres are preferably less than 40μ thick, much thicker fibres are unsuitable as too much fibre is required to obtain the required effect; the optimum fibre thickness is thought to be 20–25μ. Preferably the fibre is hydrophilic.

The invention is illustrated by way of the following examples:

To a refractory mixture comprising 73 parts per 100 of bauxite in aggregate and fines; 10 parts per 100 of alumina fines; 5 parts per 100 of kyanite; 4 parts per 100 of clay binder and 8 parts per 100 of a hardening agent (hydraulic cement); with 0.2 parts per 100 of a deflocculating agent: 7% by weight of water is added to produce a composition with 7 parts of water to every 100 parts of solid.

Various proportions of finely divided aluminium powder, of at least 99% purity and/or a monofilament polypropylene fibre of 22.7μ diameter and 6 mm average length were added as shown by the table below.

Samples were produced from the mixture in the form of 76 mm cubes, were permitted to cure for 24 hours and a series of any one type of sample were then inserted into an experimental furnace at a series of increasing temperatures with the first temperature at which spalling of a sample occurred being noted.

TABLE

| Example Number | % by weight of anti-spalling additives | Spalling temperature |
|---|---|---|
| 1 | Base mixture - no additives | 600 Degrees C. |
| 2 | 0.05% fibre | 600 Degrees C. |
| 3 | 0.075% fibre | 500 Degrees C. |
| 4 | 0.1% fibre | 800 Degrees C. |
| 5 | 0.05% aluminium | 600 Degrees C. |
| 6 | 0.1% aluminium | 800 Degrees C. |
| 7 | 0.05% fibre 0.1% AL | 900 Degrees C. |
| 8 | 0.05% fibre 0.05% AL | Passed 800 Degrees C. Partially spalled at 900 Degrees C. |

When the Al level is raised to 0.1%—as in examples 6 and 7, the level of hydrogen evolution is too high, giving rise to fire and explosion hazards on firing.

When the fibre level is at 0.1% or greater—as in example 4, the flow and mixing characteristics of the mixture are degraded, causing problems of uniform fibre dispersion and moulding. This can be partially remedied by increasing the water content of the mix, but this has other deleterious effects on the refractory properties.

Zinc can be used as the metal, but its presence can, in some applications, cause fluxing problems in the fired refractories.

The chosen fibre should completely degrade by 250 degrees C. without leaving any residue, i.e. hydrocarbon polymeric fibres are preferred to materials such as polyamides which can leave a significant charred residue upon thermal degradation.

The mixtures of the present invention have the advantages that by using lower fibre contents than have hitherto been disclosed the effect of the stiffening of the mix by the addition of the fibre is minimised, and therefore the need to add additional water to restore the flow properties of the mix is avoided.

We claim:

1. In a refractory composition for in situ firing to form a refractory lining, the refractory composition comprising refractory aggregate and refractory clay binder, the improvement comprising effective amounts of less than 0.1% by weight each of finely divided metallic powder and short length organic fibers for increasing the spalling resistance during said in situ firing.

2. A refractory composition as claimed in claim 1 wherein said metallic powder is aluminum.

3. A refractory composition as claimed in claim 2 wherein the amount of aluminum powder is not greater than about 0.05% by weight.

4. A refractory composition as claimed in claim 1 wherein the fibers are polypropylene fiber.

5. A refractory composition as claimed in claim 4 wherein the amount of polypropylene fibers is not greater than about 0.05% by weight.

6. A refractory composition as claimed in claim 4 wherein the polypropylene fibers are about 6 mm in length and 20–25 microns in thickness.

7. A refractory composition as claimed in claim 1 wherein said metallic powder is aluminum powder in an amount not greater than about 0.05% by weight, and said fibers are polypropylene fibers in an amount not greater than about 0.05% by weight.

8. A refractory composition as claimed in claim 1 wherein said refractory composition also includes a hardening agent comprising hydraulic cement.

* * * * *